(12) United States Patent
Shim et al.

(10) Patent No.: US 11,783,736 B2
(45) Date of Patent: Oct. 10, 2023

(54) LIGHTING DEVICE FOR IMPLEMENTING IMAGE

(71) Applicants: HYUNDAI MOTOR COMPANY, Seoul (KR); KIA CORPORATION, Seoul (KR)

(72) Inventors: Joon Bo Shim, Seoul (KR); Seung Pyo Hong, Incheon (KR); Ki Hong Lee, Seoul (KR); Byoung Suk Ahn, Gwacheon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/881,767

(22) Filed: Aug. 5, 2022

(65) Prior Publication Data
US 2023/0080699 A1    Mar. 16, 2023

(30) Foreign Application Priority Data

Sep. 15, 2021    (KR) .......................... 10-2021-0123264

(51) Int. Cl.
*G09F 11/10*       (2006.01)
*B60Q 1/50*        (2006.01)
*G09F 9/37*        (2006.01)

(52) U.S. Cl.
CPC ............ *G09F 11/10* (2013.01); *B60Q 1/5035* (2022.05); *G09F 9/37* (2013.01)

(58) Field of Classification Search
CPC . G09F 11/10; G09F 9/37; G09F 19/02; G09F 21/042; G09F 9/33; G09F 19/12; B60Q 1/5035; B60Q 1/549; B60Q 1/507; B60Q 1/2611; B60Q 1/547; F21W 2103/60; F21W 2104/00; F21S 43/14; F21S 43/243; F21S 43/15; F21S 43/237; F21S 43/247; F21S 43/27
See application file for complete search history.

(56) References Cited

U.S. PATENT DOCUMENTS 6,314,651 B1 * 11/2001 Ohtomo ............... G01C 15/004
                                                  33/290
6,577,286 B1 *  6/2003 Jang ....................... G09G 3/005
                                                  345/82

FOREIGN PATENT DOCUMENTS

KR    1994-0008958 A    5/1994

* cited by examiner

*Primary Examiner* — Omeed Alizada
(74) *Attorney, Agent, or Firm* — MCDONNELL BOEHNEN HULBERT & BERGHOFF LLP

(57) ABSTRACT

An image for communication with outside pedestrians is implemented by an afterimage effect by means of a cylindrical display installed at an upper end of a mobility vehicle, and visibility is ensured. In addition, the number of light sources for implementing the image is reduced, an overall size of a lighting device is reduced, and durability and reliability are improved because there is no direct mechanical contact.

12 Claims, 9 Drawing Sheets

LIGHTING DEVICE FOR IMPLEMENTING IMAGE

CROSS REFERENCE TO RELATED APPLICATIONS

The present application claims priority of Korean Patent Application No. 10-2021-0123264 filed on Sep. 15, 2021, the entire contents of which is incorporated herein for all purposes by this reference.

BACKGROUND

Field of the Disclosure

The present disclosure relates to a lighting device for implementing an image that implements various types of images using an afterimage effect.

Description of the Related Art

Recently, not only traveling functions of mobility vehicles, but also communication functions between the mobility vehicles and between the mobility vehicle and persons are considered important.

To this end, lighting devices using light sources are applied, but most of the lighting devices focus on emitting light forward. Therefore, the technologies have been developed focusing on ensuring light concentration and diffusion.

However, an autonomous driving mobility vehicle essentially requires a device for communicating with outside pedestrians as utilization thereof increases, and thus the accuracy of messages intended to be transmitted during the communication is considered important.

Therefore, a circular display is applied to a roof of the mobility vehicle and visualized at 360 degrees. Because the circular display is disposed on an uppermost end of the mobility vehicle, the circular display is advantageous in that the visibility of the circular display is high.

However, because the circular display in the related art needs to have high resolution and improved brightness, a plurality of light sources for forming images needs to be disposed on an entire peripheral surface of the circular display.

That is, because all the light sources need to be applied to an overall area of the circular display, about 1,500 to 2,500 light sources are required, which increases manufacturing costs and size of the circular display.

The above-mentioned matters described as the background art are provided merely to aid understanding of the background of the present disclosure, and should not be construed to admit that the matters correspond to the technologies already known to those skilled in the art.

SUMMARY

Accordingly, the present disclosure has been made keeping in mind the above problems occurring in the related art, and the present disclosure is intended to provide a lighting device for implementing an image, in which images for communication with outside pedestrians are implemented by an afterimage effect by means of a cylindrical display installed at an upper end of a mobility vehicle, such that visibility is ensured, the number of light sources is reduced, and an overall size of the lighting device is reduced.

According to one aspect, there is provided a lighting device for implementing an image, the lighting device including a rotary body connected to a drive unit, rotatably provided, and having an internal space, a plurality of light guides disposed in the internal space of the rotary body and each having one end penetrating a peripheral surface of the rotary body from inside to outside and the other end extending downward; a fixing body disposed below the rotary body and having a plurality of light sources arranged around the rotary body and configured to emit light toward the light guides, and a controller configured to rotate the rotary body by controlling the drive unit and control and turn on or off the respective light sources to allow the light sources to emit the light through the light guides when an image intended to be implemented is inputted, such that an afterimage effect occurs by a rotation of the rotary body, and the image is implemented.

The rotary body may have a cylindrical shape, and the drive unit may be installed on the fixing body and connected to a center of a lower surface of the rotary body.

One end of one of the light guides may be spaced apart from one end of another light guide in a diagonal direction along the peripheral surface of the rotary body, and the other end of the light guide may extend straight downward and may penetrate a lower surface of the rotary body.

A length of one end of each of the plurality of light guides may be constant, and a length of the other end of the light guide gradually may decrease or increase in a circumferential direction of the rotary body, such that the light guides may be disposed on the rotary body and spaced apart from one another in the diagonal direction.

The light guide may be curved downward so that a curved portion is formed between one end and the other end of the light guide, and the curved portions of plurality of light guides may have the same curvature.

An emergent surface of one end of the light guide may be smaller than an incident surface of the other end of the light guide.

A first holder may be formed on the peripheral surface of the rotary body, one end of each of the light guides may be penetratively fixed to the first holder, a second holder may be formed on a lower surface of the rotary body, and the other end of each of the light guides may be penetratively fixed to the second holder.

The number of light sources may be twice or more the number of light guides, and the two or more light sources may be disposed between the respective light guides.

An optical guider may be provided on the fixing body and extends in a direction in which the plurality of light sources is arranged, the optical guider may have through-holes penetratively formed in a direction toward the rotary body and disposed at portions matched with the respective light sources, and the optical guider may guide the light emitted from the light sources so that the light propagates toward the light guides through the through-holes.

The controller may divide the plurality of light sources into the odd-numbered light sources and the even-numbered light sources and control and turn on or off the respective light sources for implementing the image so that the odd-numbered light sources and the even-numbered light sources are not simultaneously turned on.

When the controller receives information on a rotational speed and a position of the rotary body from a sensor unit and controls the light sources to implement the image and the rotary body rotates, the light source may be kept turned on from a point in time immediately before the other end of the light guide enters the light source to be turned on to a point in time immediately before the other end of the light guide separates from the light source.

The lighting device may further include an outer lens configured to surround the rotary body and the fixing body, in which a portion of the outer lens matched with the rotary body is transparent, and a portion of the outer lens matched with the fixing body is opaque.

According to the lighting device for implementing an image structured as described above, the image for communication with outside pedestrians is implemented by the afterimage effect by means of the cylindrical display installed at the upper end of the mobility vehicle, and the visibility is ensured.

In addition, the number of light sources for implementing the image is reduced, the overall size of the lighting device is reduced, and the durability and reliability are improved because there is no direct mechanical contact.

DETAILED DESCRIPTION

Figure 1:
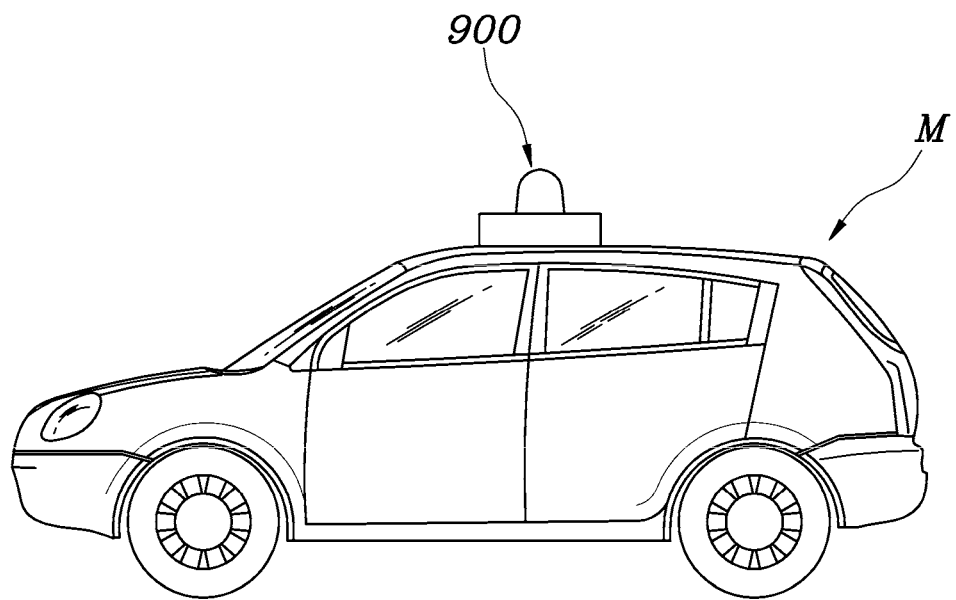
FIG. 1 is a view illustrating a mobility vehicle to which a lighting device for implementing an image according to an embodiment of the present disclosure is applied.
Figure 2:
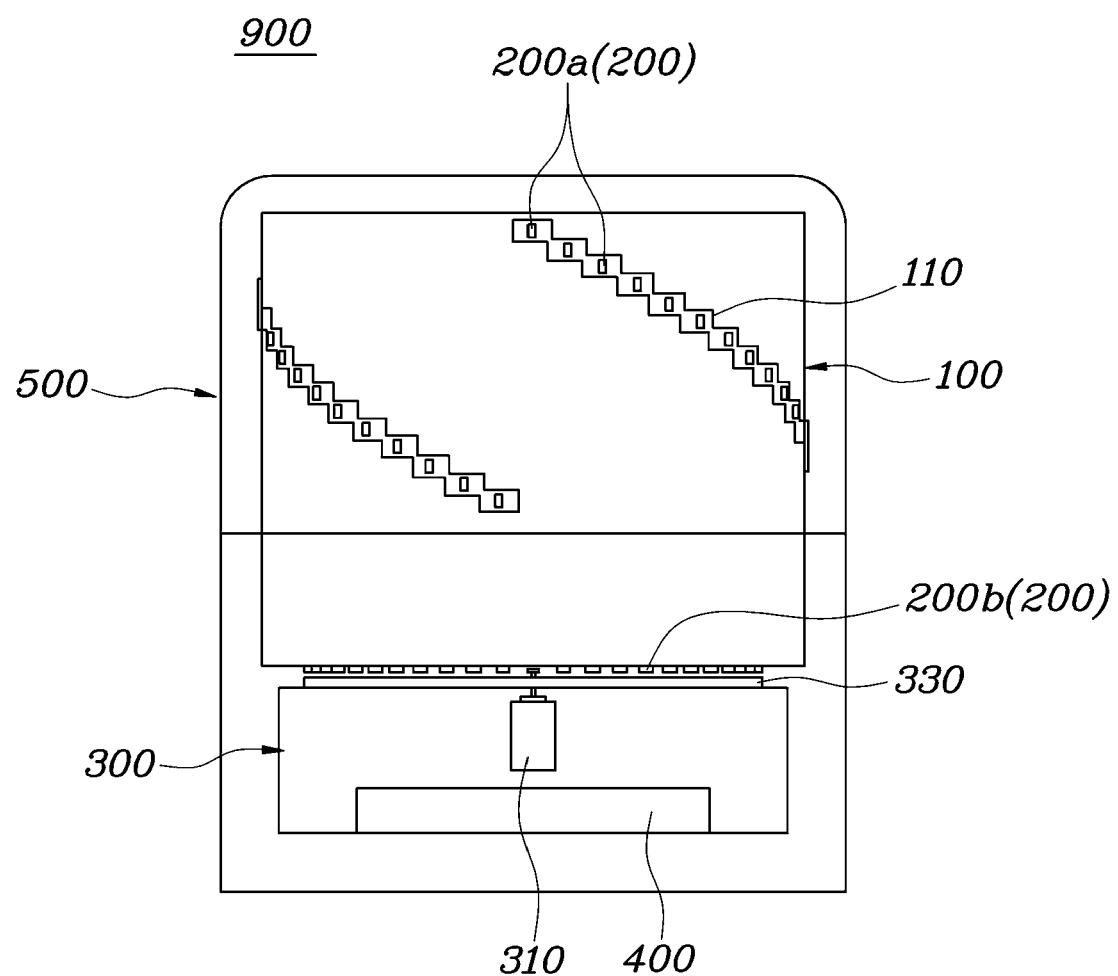
FIG. 2 is a side view illustrating the lighting device for implementing an image according to the embodiment of the present disclosure.

Hereinafter, a lighting device for implementing an image according to an exemplary embodiment of the present disclosure will be described with reference to the accompanying drawings.

As illustrated in FIGS. 1 to 4, a lighting device 900 for implementing an image according to the present disclosure includes a rotary body 100 connected to a drive unit 310, rotatably installed, and having an internal space. The lighting device 900 further includes a plurality of light guides 200 disposed in an internal space of the rotary body 100, and each having one end 200a penetrating a peripheral surface 100a of the rotary body 100 from inside to outside and the other end 200b extending downward. The lighting device 900 also includes a fixing body 300 positioned below the rotary body 100 and having a plurality of light sources 320 arranged around the rotary body 100 and configured to emit light toward the light guides 200. The lighting device 900 further includes a controller 400 configured to rotate the rotary body 100 by controlling the drive unit 310 and control and turn on or off the respective light sources 320 to allow the respective light sources 320 to emit the light through the light guides 200 when an image intended to be implemented is inputted, such that an afterimage effect occurs by a rotation of the rotary body 100, and the image is implemented.

The lighting device for implementing an image according to the present disclosure may be installed at an upper end of a roof of a mobility vehicle M.

In this case, the rotary body 100 and the fixing body 300 are disposed inside the outer lens 500, such that an inflow of foreign substances may be blocked, and the rotary body 100 and the fixing body 300 may be protected from impact. The outer lens 500 may have a cylindrical shape having an internal space in which the rotary body 100 and the fixing body 300 are disposed. The outer lens 500 is larger in size than the rotary body 100 so that the rotary body 100 may smoothly rotate in the outer lens 500.

In addition, a portion of the outer lens 500, which is matched with the rotary body 100, is transparent, such that the light emitted from the light sources 320 is transmitted to the outside. A portion of the outer lens 500, which is matched with the fixing body 300, is opaque or formed so that the inside of the outer lens 500 is not visible. Therefore, the drive unit 310, the plurality of light sources 320, and the controller 400, which are disposed in the fixing body 300, are not exposed to the outside. Therefore, in the lighting device for implementing an image according to the present disclosure, an image is implemented as the light emitted from the light sources 320 is transmitted through the outer lens 500. An external aesthetic appearance is ensured because the components such as the drive unit 310, the light sources 320, and the controller 400 in the outer lens are not exposed to the outside.

Meanwhile, the fixing body 300 is fixed in position, and the drive unit 310, the plurality of light sources 320, and the controller 400 are installed in the fixing body 300.

In this case, the rotary body 100 is installed on the fixing body 300 and rotatable by the drive unit 310. The rotary body 100 rotates relative to the fixing body 300 when the drive unit 310 operates.

The plurality of light guides 200 is disposed on the rotary body 100 and each has one end 200a penetratively connected to the peripheral surface 100a of the rotary body 100, and the other end 200b extending to a lower side of the rotary body 100 and penetratively connected to a lower surface 100b of the rotary body 100.

In addition, the plurality of light sources 320 configured to emit the light toward the light guides 200 is installed on the fixing body 300 and arranged around the rotary body 100 on which the light guides 200 are arranged.

Therefore, the light emitted from the light source 320 enters the other end 200b of the light guide 200 and exits one end 200a of the light guide 200, such that the light is radiated from the peripheral surface 100a of the rotary body 100.

In particular, in the present disclosure, the controller 400 controls the drive unit 310 and the light sources 320 so that a specific image is implemented from the rotary body 100. In this case, the controller 400 may control the drive unit 310 and the light sources 320 through CAN communication and adjust a rotational speed of the rotary body 100 and a timing of turning on or off the light sources 320 using the drive unit 310 according to the image intended to be implemented.

Therefore, in a state in which the rotary body 100 rotates under the control of the controller 400, the light is radiated through the light guides 200 as the respective light sources 320 are turned on or off, and the afterimage effect is generated as the rotary body 100 is rotated, such that the image is implemented.

Figure 3:
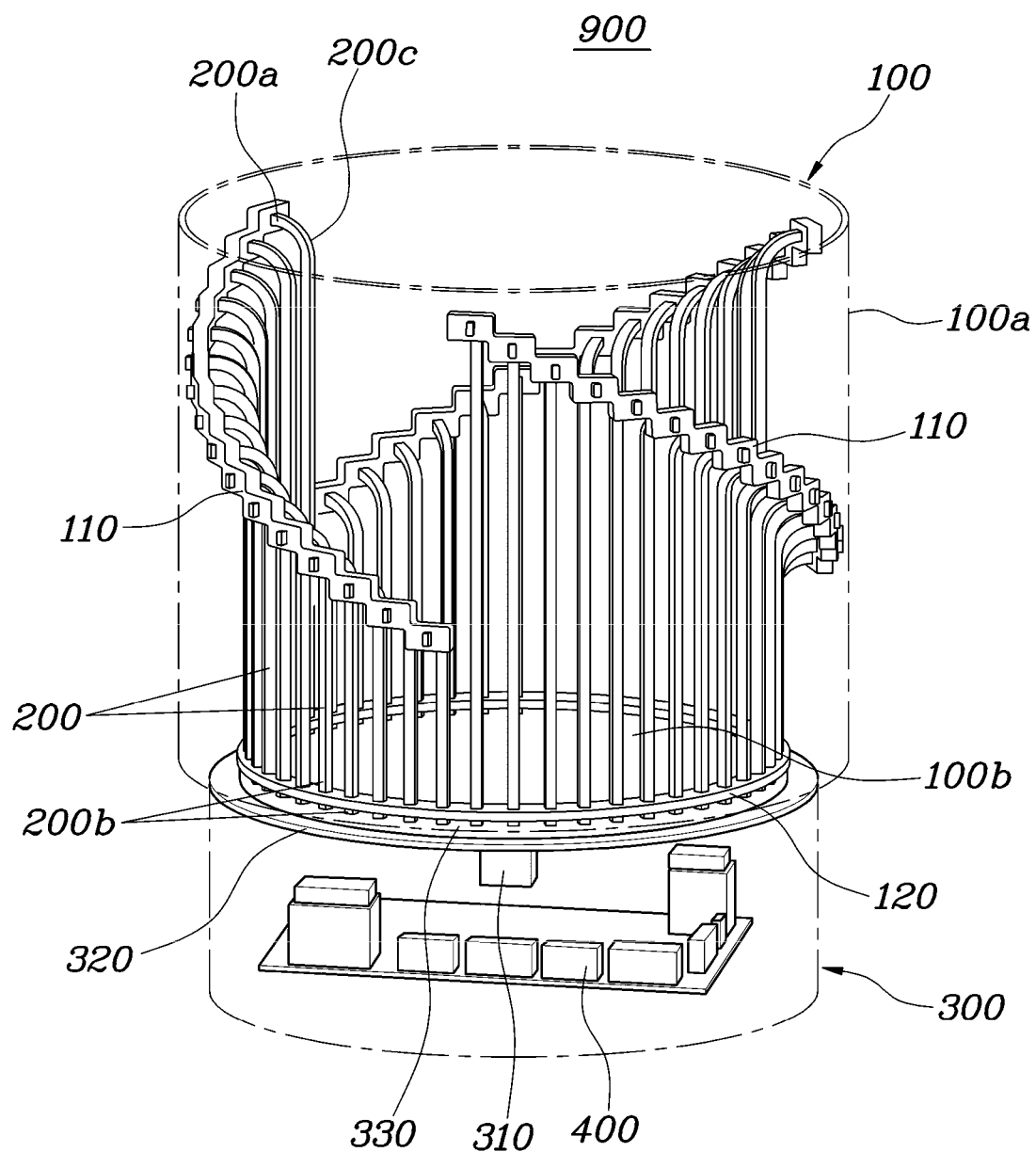
FIG. 3 is a view for explaining the lighting device for implementing an image illustrated in FIG. 2.
Figure 4:
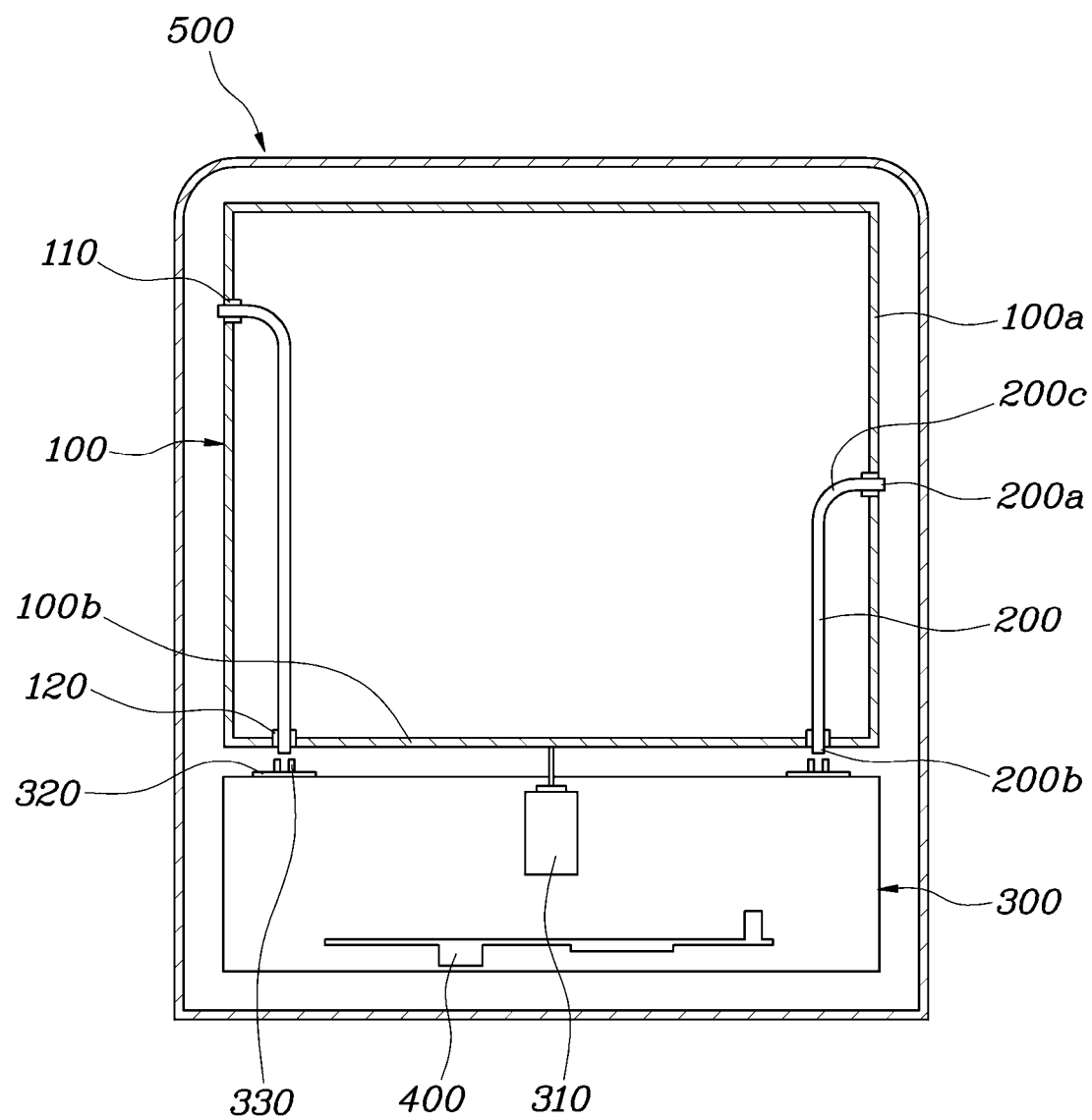
FIG. 4 is a cross-sectional view of the lighting device for implementing an image illustrated in FIG. 2.

As illustrated in FIGS. 3 and 4, the rotary body 100 has a cylindrical shape, and the drive unit 310 is installed on the fixing body 300 and connected to a center of the lower surface 100b of the rotary body 100.

Since the rotary body 100 has a cylindrical shape as described above, the afterimage effect may be generated when the light is radiated through the light guides 200 connected to the peripheral surface 100a of the rotary body 100.

In addition, since the drive unit 310 installed on the fixing body 300 is connected to the center of the lower surface 100b of the rotary body 100, such that the rotational operation of the rotary body 100 is stabilized.

In this case, one end 200a of one of the light guides 200 is spaced apart from one end 200a of another light guide 200 in a diagonal direction along the peripheral surface 100a of the rotary body 100. The other end 200b of the light guide 200 extends straight downward and penetrates the lower surface 100b of the rotary body 100.

Figure 5:
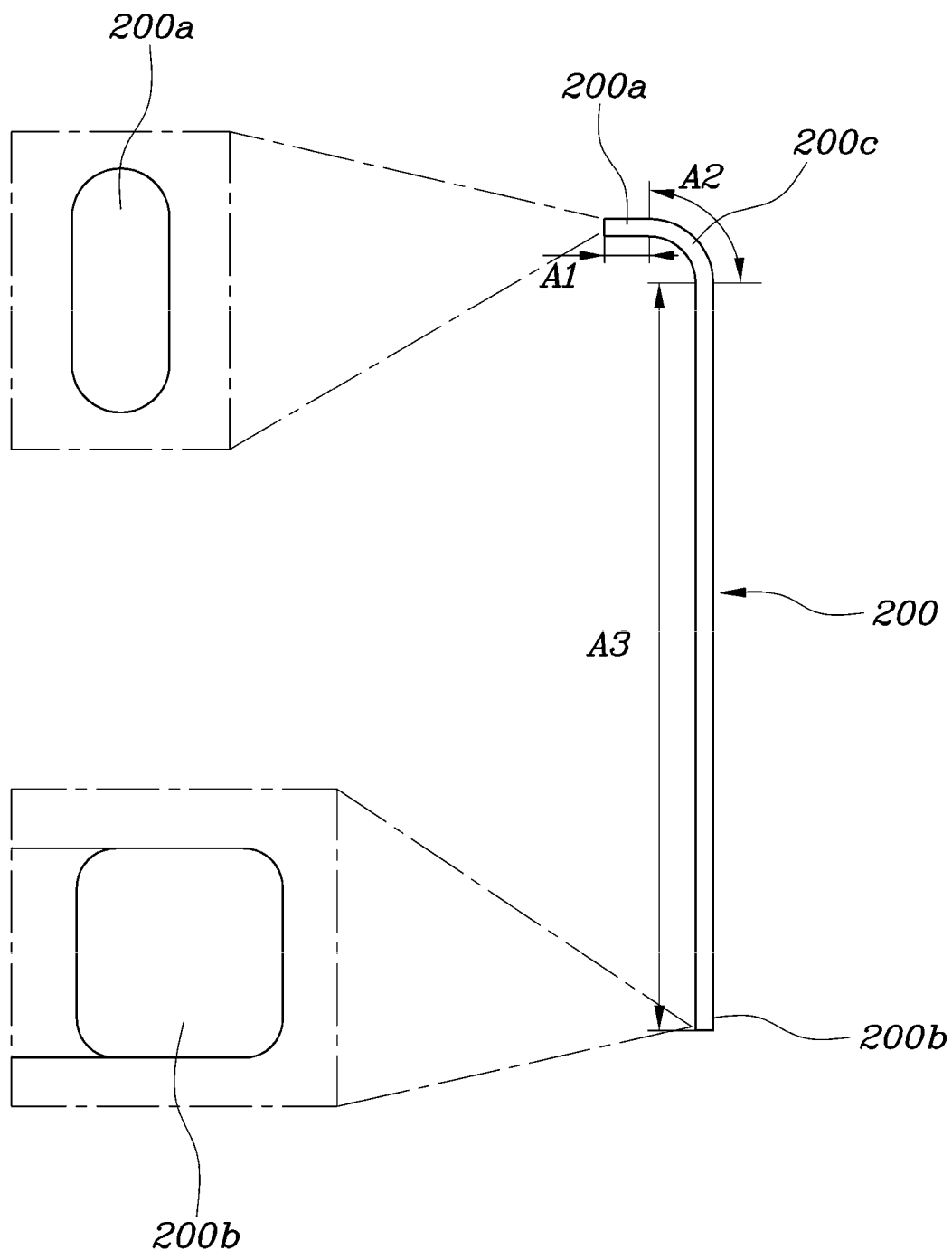
FIG. 5 is a view for explaining a light guide according to the embodiment of the present disclosure.
Figure 6:
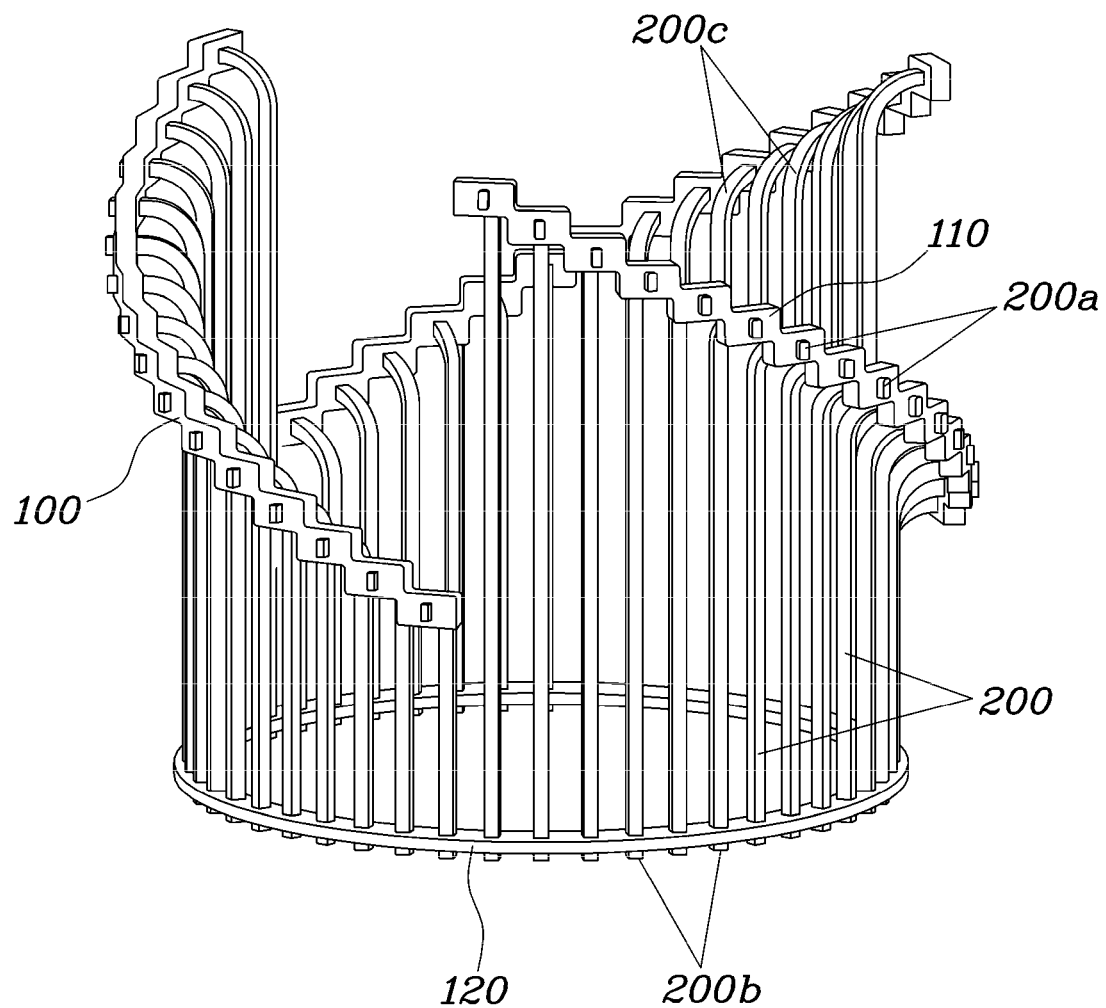
FIG. 6 is a view illustrating the light guide and a holder according to the present disclosure.

That is, as illustrated in FIGS. 4 to 6, one end 200a of the light guide 200 is penetratively connected (i.e., extends through an end of) to the peripheral surface 100a of the rotary body 100, and the other end 200b of the light guide 200 extends downward and is penetratively connected to the lower surface 100b of the rotary body 100. In this case, since one end 200a of one of the light guides 200 is spaced apart from one end 200a of another light guide 200 in the diagonal direction along the peripheral surface 100a of the rotary body 100, the plurality of light guide 200 may be disposed without interfering with one another, and the light may be radiated through the light guides 200 from the entire region of the peripheral surface 100a of the rotary body 100 from which the light is emitted. In addition, since the other end 200b of the light guide 200 extends straight downward, the interference between the light guides 200 is avoided.

In this case, the plurality of light guides 200 is connected to the rotary body 100 by means of a first holder 110 and a second holder 120. That is, as illustrated in FIG. 6, the first holder 110 is formed on the peripheral surface 100a of the rotary body 100, and one end 200a of each of the light guides 200 is penetratively fixed to the first holder 110. The second holder 120 is formed on the lower surface 100b of the rotary body 100, and the other end 200b of each of the light guides 200 is penetratively fixed to the second holder 120. Therefore, the light guides 200 may be fixed to the rotary body 100.

The first holder 110 is provided in the diagonal direction on the peripheral surface 100a of the rotary body 100, such that one end 200a of the light guide 200 is disposed in the diagonal direction. The second holder 120 is provided in a circumferential direction on the lower surface 100b of the rotary body 100, such that the other end 200b of the light guide 200 is connected and fixed to the second holder 120.

In detail, a length A1 of one end 200a of each of the plurality of light guides 200 is constant, and a length A2 of the other end 200b gradually increases or decreases in the circumferential direction, such that the light guides 200 are spaced apart from one another in the diagonal direction and disposed on the rotary body 100.

In addition, the light guide 200 is curved downward, such that a curved portion 200c is formed between one end 200a and the other end 200b. The curved portions 200c of the plurality of light guides 200 have the same curvature.

As illustrated in FIG. 5, the length A1 of one end 200a of each of the plurality of light guides 200 is constant, and a length A3 of the curved portion 200c is constant, which makes it possible to ensure uniformity of the light radiated from one end 200a of each of the light guide 200. In this case, as the curvature of the curved portion 200c of the light guide 200 increases, the light is more smoothly reflected, and a direction of the light is changed. A large curvature of the curved portion 200c may be ensured.

In addition, since the length A2 of the other end 200b of each of the plurality of light guides 200 gradually decreases or increases in the circumferential direction, one end 200a of each of the light guides 200 may be disposed in the diagonal direction along the peripheral surface 100a of the rotary body 100. Since one end 200a of each of the plurality of light guides 200 is disposed in the diagonal direction along the peripheral surface 100a of the rotary body 100 as described above, it is possible to ensure a region in which the respective light guides 200 do not interfere with one another and the light is radiated upward and downward from the rotary body 100.

That is, according to the present disclosure, since one end 200a of one of the light guides 200 and one end 200a of another light guide 200 are disposed upward and downward in the diagonal direction based on the rotary body 100, the light radiated from one end 200a of each of the light guides 200 is radiated from the entire peripheral surface 100a of the rotary body 100 when the rotary body 100 rotates. Therefore, the image may be implemented through the rotary body 100.

Meanwhile, as illustrated in FIG. 5, an emergent surface of one end 200a of the light guide 200 is smaller than an incident surface of the other end 200b of the light guide 200.

Since the size of the incident surface of the other end 200b of the light guide 200 is ensured as described above, a loss of light is minimized when the light emitted from the light source 320 enters the other end 200b of the light guide 200.

In particular, since the emergent surface of the one end 200a of the light guide 200 is smaller in size than the incident surface of the other end 200b, the visibility of the image made by the light exiting one end 200a is improved.

For example, the emergent surface of one end 200a of the light guide 200 may have an area that is ½ or less of an area of the emergent surface of the other end 200b.

If the emergent surface of one end 200a of the light guide 200 is equal to or larger in size than the emergent surface of the other end 200b, the afterimage image is stretched in the rotation direction of the rotary body 100 because of the rotation of the rotary body 100. Therefore, the emergent surface of one end 200a of the light guide 200 may have an area that is ½ or less of an area of the emergent surface of the other end 200b, such that the afterimage image having the same pixels may be implemented by the rotation of the rotary body, thereby ensuring the visibility.

Meanwhile, the number of light sources 320 is twice or more the number of light guides 200, such that the two or more light sources 320 may be provided between the respective light guides 200.

Since the number of light sources 320 is larger than the number of light guides 200 as described above, the light emitted from the respective light sources 320 sequentially enters the light guides 200 in the state in which the rotary body 100 rotates, such that the clearer image may be implemented.

If the number of light sources 320 is equal to or smaller than the number of light guides 200, the amount of light entering the light guides 200, when the rotary body 100 rotates, decreases, which degrades the clarity of the image. Therefore, the number of light sources 320 is twice or more the number of light guides 200.

In addition, since the number of light sources 320 is twice or more the number of light guides 200, the two or more light sources 320 are provided between the respective light guides 200, such that the amount of light entering the respective light guides 200 is ensured, the amount of light exiting the light guides 200 is uniformized, and the clarity of the image is improved.

That is, according to the embodiment of the present disclosure, since the number of light sources 320 is twice or more the number of light guides 200, the additional light sources 320 are disposed between the respective light guides 200. Therefore, the clarity of the image exiting the light guides 200 may be improved by sequentially turning on or off the respective light sources 320 even though the rotary body 100 rotates.

Figure 7:
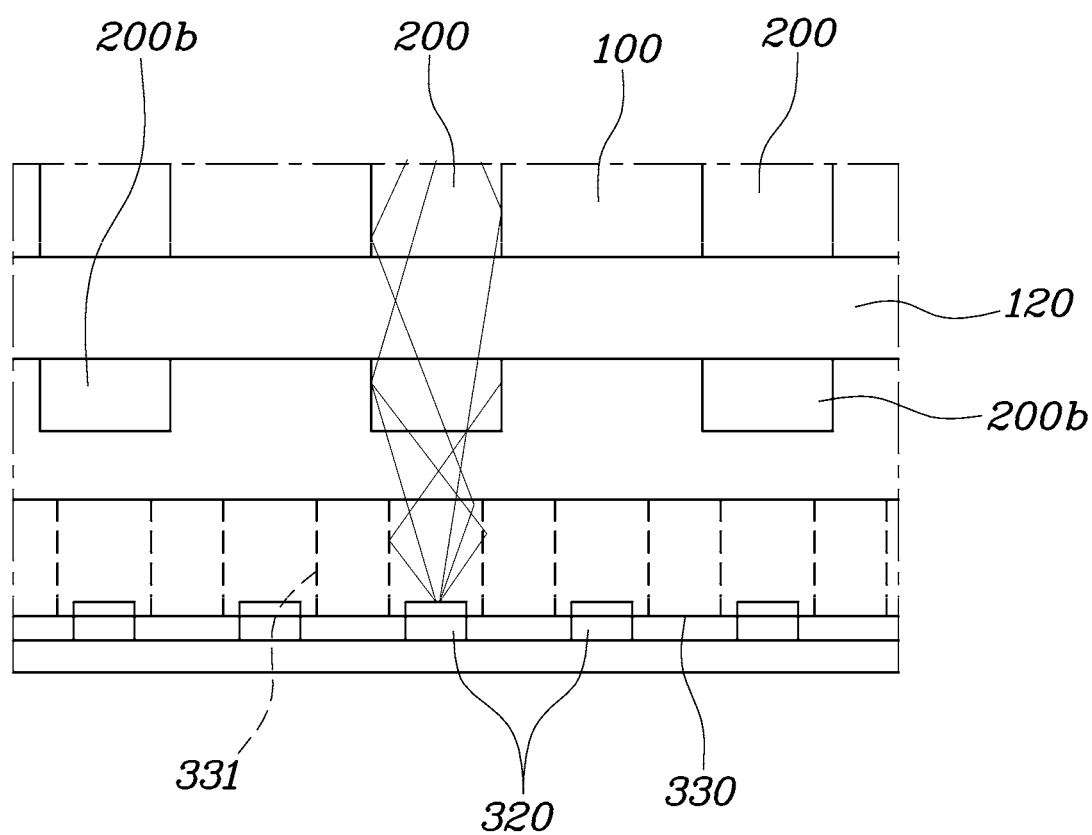
FIG. 7 is a view for explaining a light guider according to the present disclosure.

Meanwhile, as illustrated in FIG. 7, an optical guider 330 is provided on the fixing body 300 and extends in a direction in which the plurality of light sources 320 is arranged. The optical guider 330 has through-holes 331 penetratively formed in a direction toward the rotary body 100 and disposed at portions matched with the light sources 320. The optical guider 330 guides the light emitted from the light sources 320 so that the light propagates toward the light guides 200 through the through-holes 331.

That is, the optical guider 330 is provided on the fixing body 300 and extends in the direction in which the light sources 320 are arranged. The plurality of through-holes 331 is formed in the optical guider 330 and matched with the light sources 320. Therefore, the light emitted from the light sources 320 is collected while being reflected in the through-holes 331 of the optical guider 330 and then enters the light guides 200.

Further, the light exiting the through-holes 331 of the optical guider 330 is prevented from being radiated in the other directions instead of the direction toward the corresponding light guides 200, such that the light is prevented from entering the other light guides 200 other than the light guide 200 matched with the through-hole 331 of the optical guider 330.

Meanwhile, the controller 400 divides the plurality of light sources 320 into the odd-numbered light sources 320 and the even-numbered light sources 320 and controls and turns on or off the light sources 320 for implementing an image so that the odd-numbered light sources 320 and the even-numbered light sources 320 are not simultaneously turned on.

That is, the controller 400 controls and turns on or off the respective light sources 320 so that two opposite light sources 320, which are disposed at the light source 320 turned on, are turned off. To this end, the plurality of light sources 320 is divided into the odd-numbered light sources 320 and the even-numbered light sources 320, and the controller 400 separately controls and turns on or off the odd-numbered light sources 320 and the even-numbered light sources 320.

Figure 8:
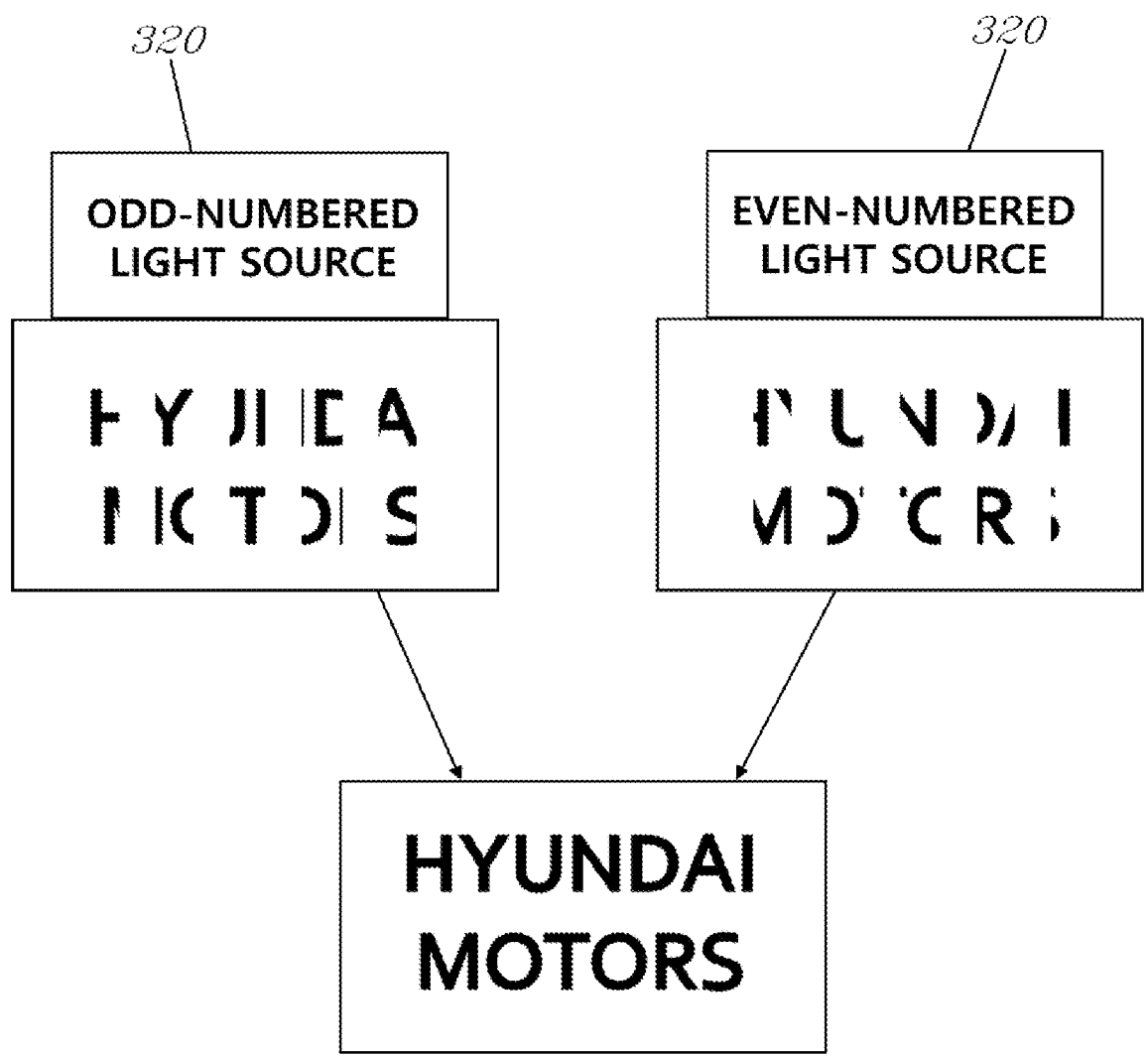
FIG. 8 is a view illustrating an example in which an image is implemented by the lighting device for implementing an image according to the present disclosure.

For example, as illustrated in FIG. 8, in order to implement an image indicating "HYUNDAI MOTORS", the image implemented by the odd-numbered light sources 320 and the image implemented by the even-numbered light sources 320 are distinguished, and the controller 400 separately controls and turns on or off the odd-numbered light sources 320 and the even-numbered light sources 320, thereby finally creating the image indicating "HYUNDAI MOTORS". Therefore, the even-numbered light sources 320 are turned off when the odd-numbered light sources 320 are turned on, and the odd-numbered light sources 320 are turned off when the even-numbered light sources 320 are turned on, such that the afterimage effect may create the image through the rotating rotary body 100.

In addition, since the plurality of light sources 320 is divided into the odd-numbered light sources 320 and the even-numbered light sources 320 and separately turned on, the operating time of the respective light sources 320 is reduced by 50%, and durability of the respective light sources 320 is improved.

Meanwhile, when the controller 400 receives information on a rotational speed and a position of the rotary body 100 from a sensor unit and controls the light sources 320 to implement the image and the rotary body 100 rotates, the light source 320 is kept turned from a point in time before the other end 200b of the light guide 200 is matched with the light source 320 to a point in time after the other end 200b of the light guide 200 is separated from the light source 320.

In this case, the sensor unit may be a position sensor or an infrared ray sensor. The controller 400 receives information on the rotational speed and the rotation position of the rotary body 100 from the sensor unit.

Therefore, when the image intended to be implemented is inputted, the controller 400 may determine the timing of turning on or off the light sources 320 according to the rotational speed of the rotary body 100 and the rotation position of the rotary body 100.

Figure 9:
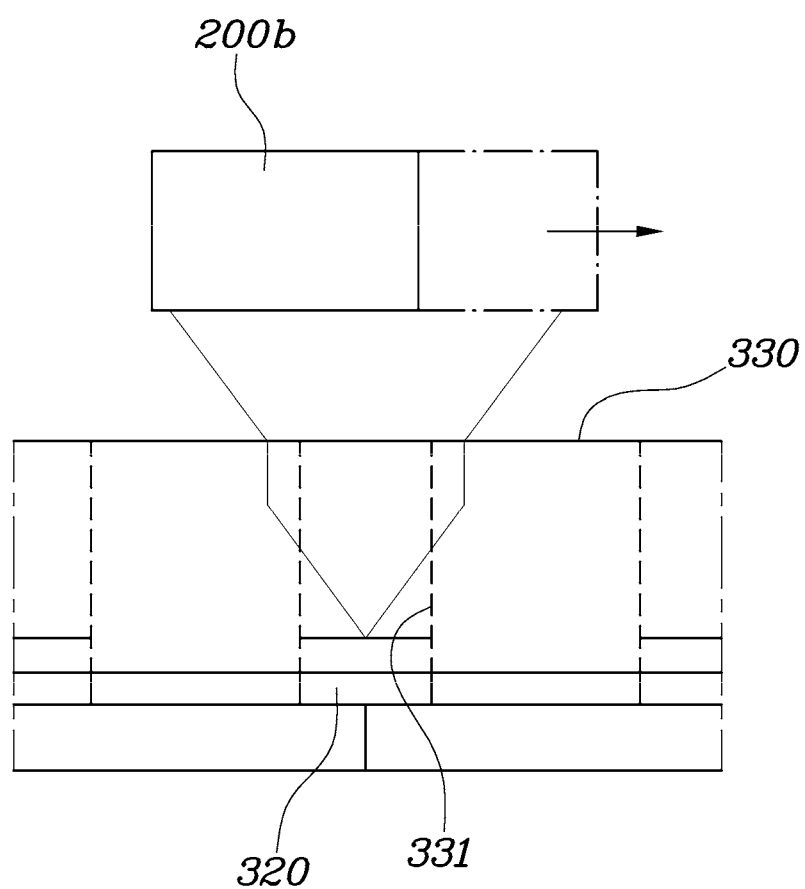
FIG. 9 is a view for explaining an operation of the lighting device for implementing an image according to the present disclosure.

In particular, as illustrated in FIG. 9, when the light guide 200 moves while the rotary body 100 rotates, the controller 400 maintains the turned-on state of the light source 320 from a point in time immediately before the other end 200b of the light guide 200 enters the light source 320 to be turned on to a point in time immediately before the other end 200b of the light guide 200 separates from the light source 320, such that the sufficient amount of light emitted from the light source 320 enters the light guide 200, and the accuracy and clarity of the image created by the light guides 200 are improved.

According to the lighting device for implementing an image structured as described above, the image for communication with outside pedestrians is implemented by the afterimage effect by means of the cylindrical display installed at the upper end of the mobility vehicle, and the visibility is ensured.

In addition, the number of light sources 320 for implementing the image is reduced, the overall size of the lighting device is reduced, and the durability and reliability are improved because there is no direct mechanical contact.

While the specific embodiments of the present disclosure have been illustrated and described, it will be obvious to those skilled in the art that the present disclosure may be variously modified and changed without departing from the technical spirit of the present disclosure defined in the appended claims.

The invention claimed is:

1. A lighting device for implementing an image, the lighting device comprising:
   a rotary body rotatably connected to a drive unit, and having an internal space;
   a plurality of light guides positioned in the internal space of the rotary body, each of the plurality of light guides having a first end penetrating a peripheral surface of the rotary body from inside to outside, and a second end extending downward;
   a fixing body positioned below the rotary body, the fixing body having a plurality of light sources arranged around the rotary body, and the fixing body being configured to emit light toward the light guides; and a controller configured to rotate the rotary body by controlling the drive unit and to turn on or off the plurality of light sources to allow the plurality of light sources to emit light through the plurality of light guides when an image to be implemented is inputted, such that an afterimage effect occurs by a rotation of the rotary body, and the image is implemented.

2. The lighting device of claim 1, wherein the rotary body has a cylindrical shape, and the drive unit is positioned on the fixing body and connected to a center of a lower surface of the rotary body.

3. The lighting device of claim 1, wherein a first end of one of the plurality of light guides is spaced apart from a first end of another of the plurality of light guides in a diagonal direction along the peripheral surface of the rotary body, and a second end of the one of the plurality of light guides extends straight downward and penetrates a lower surface of the rotary body.

4. The lighting device of claim 1, wherein a length of a first end of each of the plurality of light guides is constant, and a length of a second end of each of the plurality of light guides gradually decreases or increases in a circumferential direction of the rotary body, such that the plurality of light guides are positioned on the rotary body and spaced apart from each other in a diagonal direction.

5. The lighting device of claim 1, wherein each of the plurality of light guides is curved downward so that a curved portion is formed between a first end and a second end of each of the plurality of light guides, and the curved portions of each of the plurality of light guides have the same curvature.

6. The lighting device of claim 1, wherein an emergent surface of a first end of each of the plurality of light guides is smaller than an incident surface of a second end of each of the plurality of light guides.

7. The lighting device of claim 1, wherein a first holder is formed on the peripheral surface of the rotary body, a first end of each of the plurality of light guides is penetratively fixed to the first holder, a second holder is formed on a lower surface of the rotary body, and a second end of each of the plurality of light guides is penetratively fixed to the second holder.

8. The lighting device of claim 1, wherein the number of light sources is twice or more the number of light guides, and the two or more light sources are positioned between the each of the plurality of light guides.

9. The lighting device of claim 1, wherein an optical guider is provided on the fixing body and extends in a direction in which the plurality of light sources is arranged, the optical guider has through-holes penetratively formed in a direction toward the rotary body and positioned at portions matched with the each of the plurality of light sources, and the optical guider guides light emitted from the plurality of light sources so that the light propagates toward the plurality of light guides through the through-holes.

10. The lighting device of claim 1, wherein the controller divides the plurality of light sources into odd-numbered light sources and even-numbered light sources, and turns on or off the plurality of light sources for implementing the image so that the odd-numbered light sources and the even-numbered light sources are not simultaneously turned on.

11. The lighting device of claim 1, wherein when the controller receives information on a rotational speed and a position of the rotary body from a sensor unit and controls the plurality of light sources to implement the image and the rotary body rotates, the plurality of light sources remain on from a point in time immediately before a second end of each of the plurality of light guide enters each of the plurality of light sources to be turned on to a point in time immediately before the second end of each of the plurality of light guides separates from each of the plurality of light sources.

12. The lighting device of claim 1, further comprising:
an outer lens configured to surround the rotary body and the fixing body,
wherein a portion of the outer lens surrounding the rotary body is transparent, and a portion of the outer lens surrounding the fixing body is opaque.

* * * * *